United States Patent [19]
Berni

[11] Patent Number: 4,520,467
[45] Date of Patent: May 28, 1985

[54] MARINE SEISMIC SYSTEM
[75] Inventor: Albert J. Berni, Houston, Tex.
[73] Assignee: Shell Oil Company, Houston, Tex.
[21] Appl. No.: 359,322
[22] Filed: Mar. 18, 1982
[51] Int. Cl.³ ............................ G01V 1/36; G01V 1/38
[52] U.S. Cl. ........................................ 367/24; 367/21; 364/421
[58] Field of Search ............... 367/22, 24, 21, 48, 367/49, 15, 901, 130, 43; 181/104; 364/421, 422

[56] References Cited
U.S. PATENT DOCUMENTS

| | | | |
|---|---|---|---|
| 2,740,945 | 4/1956 | Howes | 340/15 |
| 3,290,645 | 12/1966 | Pavey, Jr. et al. | 340/7 |
| 3,299,397 | 1/1967 | Pavey, Jr. et al. | 340/7 |
| 3,988,620 | 10/1976 | McDavid | 310/8.6 |
| 4,134,097 | 1/1979 | Cowles | 340/7 R |
| 4,253,164 | 2/1981 | Hall, Jr. | 367/22 |
| 4,345,473 | 8/1982 | Berni | 73/516 LM |
| 4,437,175 | 3/1984 | Berni | 367/21 |

FOREIGN PATENT DOCUMENTS 2083221A 3/1982 United Kingdom .

Primary Examiner—Nelson Moskowitz
Assistant Examiner—Ian Lobo

[57] ABSTRACT

A method for eliminating ghosts, or reflections from the air/water interface of a body of water, from seismic signals detected at a predetermined depth is provided. The method employs both a pressure sensor and a motion sensor. A seismic signal and its corresponding ghost signal detected by a pressure sensor is filtered as a function of depth of the sensor to provide a preselected amplitude and zero phase shifted band-limited spike signal at an arrival time corresponding to the arrival time midway between the seismic and ghost arrival times. Similarly, a seismic and ghost signal from a motion sensor is filtered as a function of depth of the sensor to provide a band-limited spike having an arrival time midway between the seismic and ghost arrival times. The filtered motion and pressure spikes are added together in proportion to their respective signal-to-noise ratios. The proportionally added signal is a ghost free seismic signal having a maximum signal-to-noise ratio for each frequency component and may be employed in further seismic processing steps.

8 Claims, 10 Drawing Figures

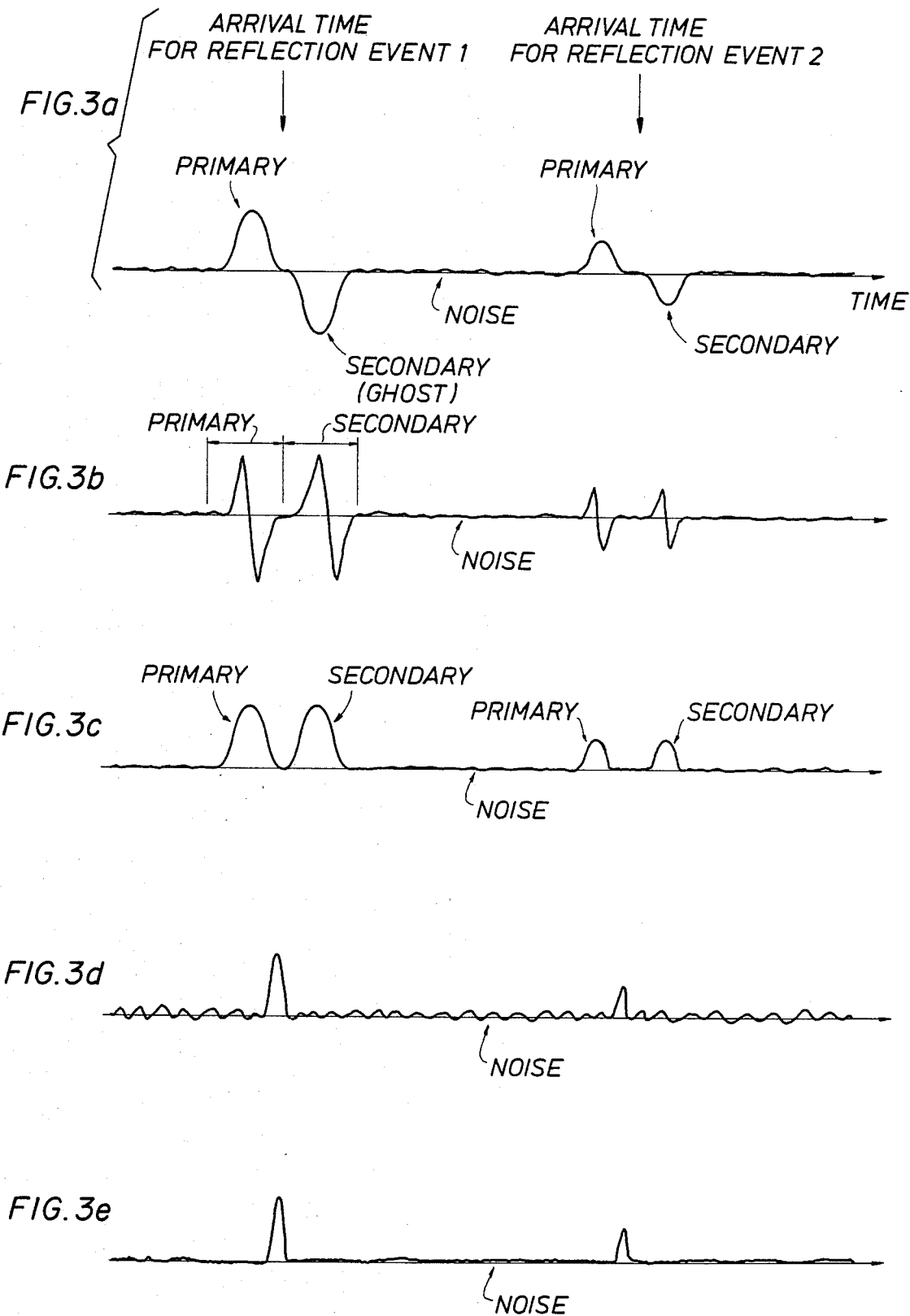

MARINE SEISMIC SYSTEM

BACKGROUND OF THE INVENTION

This invention relates generally to seismic exploration of substrata beneath bodies of water and, more particularly, to a marine seismic system for sensing reflected seismic waves from such substrata.

Marine seismic exploration is usually conducted by towing a seismic streamer at a given depth through the ocean or other body of water. The streamer is provided with a plurality of pressure sensors, such as hydrophones, disposed at appropriate intervals along the length thereof. Acoustic wave energy is provided in the vicinity of the cable by an air gun or other suitable means; this wavelet travels downwardly through the earth with a portion of it being reflected upwardly at levels where there is a contrast in the acoustic impedance characteristics of the strata. The plurality of reflections of the source wavelet generates a sequence of upwardly traveling reflection wavelets that are distributed in time. The pressure sensors detect these primary pressure waves produced in the water by the upwardly traveling reflection wavelets and provide electric signals indicative thereof to suitable processing and recording equipment located on the seismic vessel that is towing the streamer. The pressure sensors also receive secondary pressure waves reflected from the surface of the water as a result of the mismatch in acoustic impedance at the air-water interface; these secondary waves may adversely affect the seismic signals. Nearly total cancellation of certain frequencies of the seismic signal may result, since the pressure wave undergoes a 180° phase shift when reflected at the air-water interface. The prior art, such as U.S. Pat. No. 3,290,645, has attempted to overcome this problem by employing both a pressure sensor and a particle velocity sensor. The output signals of the pressure sensor in response to the primary and secondary pressure waves have opposite polarity; whereas, the output signals of the particle velocity sensor have the same polarity for the primary and secondary waves. The prior art combines the pressure wave signals with the particle velocity signals to cancel the surface reflected wave front or ghost; however, it has been found that the mere combination of a pressure wave signal with a particle velocity signal may severely degrade the signal-to-noise ratio of the lower frequencies in the seismic band so that the signal-to-noise ratio of the combined signal may be less than the signal-to-noise ratio of the pressure wave sensor alone. This high noise level in the lower frequencies of the output of the particle velocity sensor is a function of the mounting of the particle velocity sensor and the geometry and materials of the cable. Particle velocity sensors such as those disclosed in U.S. Pat. No. 3,281,768, which consist of either a particle displacement sensor in conjunction with a differentiating circuit or a particle acceleration sensor in conjunction with an integrating circuit may also be subject to the high noise levels.

Therefore, it is an object of the present invention to provide a marine seismic system that eliminates the adverse effects of the reflected, secondary pressure wave on the seismic signal and provides a good signal-to-noise ratio over the seismic band.

SUMMARY OF THE INVENTION

The present invention supplies acoustic energy to the body of water above the substrata to be seismically explored. The primary pressure wave reflected from the substrata beneath the body of water and the secondary pressure wave caused by a secondary reflection of the primary pressure wave from the air-water interface are sensed at a predetermined depth, and a first signal indicative thereof is generated. This first signal comprises a first plurality of frequency components having a plurality of amplitudes and phase shifts. The particle motion of the water accompanying the primary pressure wave and the particle motion of the water accompanying the secondary pressure wave are also sensed at the predetermined depth, and a second signal indicative thereof is generated. This second signal comprises a second plurality of frequency components having a plurality of amplitudes and phase shifts. The amplitudes of the first plurality of frequency components is multiplied by a first set of factors which equalize the amplitudes of all of the first plurality of frequency components, and the phase shifts of the first plurality of frequency components are modified so that each of the phase shifts, other than the phase shifts caused by the time at which the primary pressure wave and the secondary pressure wave are sensed, is zero to generate a third signal. The amplitudes of the second plurality of frequency components is multiplied by a second set of factors which equalize the amplitudes of all of the second plurality of frequency components to the equalized amplitudes of the first plurality of frequency components, and the phase shifts of the second plurality of frequency components are modified so that each of the phase shifts, other than phase shifts caused by the time at which the particle motion of the water accompanying the primary pressure wave and the particle motion of the water accompanying the secondary pressure wave are sensed, is zero to generate a fourth signal. The amplitude of each frequency component of the third signal is modified as a function of a first predetermined signal-to-noise ratio related to the pressure wave sensing step and a second predetermined signal-to-noise ratio related to the particle motion sensing step to generate a fifth signal, and the amplitude of each frequency component of the fourth signal is modified as a function of a first predetermined signal-to-noise ratio related to the pressure wave sensing step and a second predetermined signal-to-noise ratio related to the particle motion sensing step to generate a sixth signal. The fifth and sixth signals are then combined to produce a signal indicative of the substrata beneath the body of water.

The multiple reflections of the source wavelet from the various interfaces of the substrata results in a sequence of reflection wavelets that are distributed in time. The time interval between generation of the acoustic energy and the subsequent reception of the received wavelet is an important parameter in seismic exploration. It is well known in the art that the phase spectra of the received wavelet will have a linear phase shift versus frequency component whose slope is proportional to the time delay. The phase shift associated with this time delay is preserved in the signal processing of the present invention. The signal processing is applied to all of the reflection wavelets; however, for the sake of clarity, a single, base reflection wavelet occurring at an arbitrary time zero can be considered. The response to the plurality of reflection wavelets would be the superposition of the time delayed versions of the base wavelet response. The pressure wave and particle motion signals, which are produced in response to the base wavelet, are normalized or modified so that all of the frequency components within the signals have the same amplitude. The phase angles associated with the frequency components of the pressure wave and particle motion signals are also modified so that all of the frequency components have zero phase shift, except for the phase shifts caused by the nonzero time of arrival of the particular wavelet. The normalized, zero phase pressure wave and particle motion signals are then weighted as a function of frequency of the relative predetermined signal-to-noise ratios applicable to the pressure wave and particle motion sensors. The weighted signals are then combined and transmitted to appropriate electronic equipment for further signal processing and recording. In the preferred embodiment of the invention, the normalizing, zero phasing, weighting and combining are performed by a digital computer and the motion of the water particles accompanying the primary and secondary waves is sensed by an accelerometer; however, any sensor which senses particle displacement or any derivative thereof can be utilized to sense the motion of the water particles.

Other objectives, advantages and applications of the present invention will be made apparent by the following detailed description of the preferred embodiments of the present invention.

BRIEF DESCRIPTION OF THE DRAWINGS

FIGS. 3a through 3e are plots of sample waveforms that are generated at various points in the data acquisition system of the present invention in response to primary and secondary wavelets.

DETAILED DESCRIPTION OF THE PREFERRED EMBODIMENTS

Figure 1:
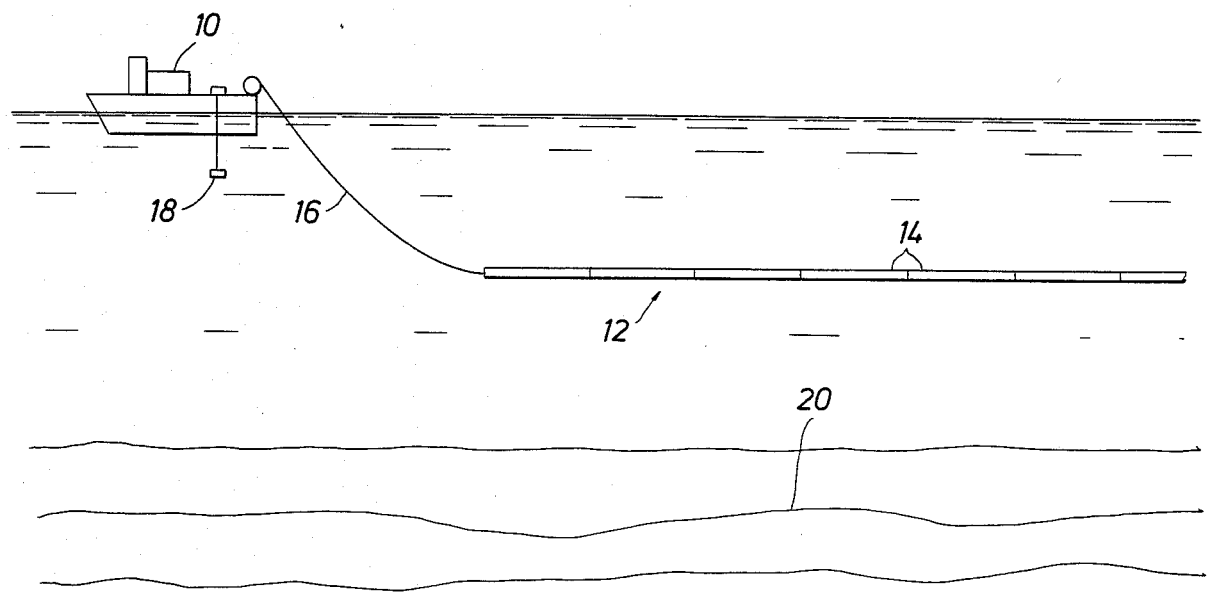
FIG. 1 is a diagrammatic view of a seismic survey utilizing a marine streamer cable that is towed through the water behind a seismic vessel.

Referring to FIG. 1, a seismic exploration vessel 10 is shown towing a marine streamer cable 12 through a body of water located above the substrata that is to be seismically explored. Cable 12 can be quite lengthy, for example, about 2 miles, and is normally composed of a number of individual sections 14 connected end to end. The forward section of cable 12 is connected to vessel 10 by a typical lead-in section 16. Each section 14 contains a number of hydrophones (not shown) and motion sensors (not shown) that are positioned in each of sections 14 so that they are interspersed as is known in the art. Acoustic wave energy is provided in the vicinity of cable 12 by an air gun 18 or other suitable means. This wavelet travels downwardly through the earth with a portion of it being reflected upwardly at levels where there is a contrast in the acoustic impedance between layers of the strata, for example, at point 20. The plurality of reflections of the source wavelet generates a sequence of upwardly traveling reflection wavelets that are distributed in time or phase shifted. The hydrophones sense the acoustic pressure waves produced in the water by the upwardly traveling reflection wavelets. The propagating wave fronts also cause movement of the water particles as they pass, which is sensed by the motion sensors.

Figure 2:
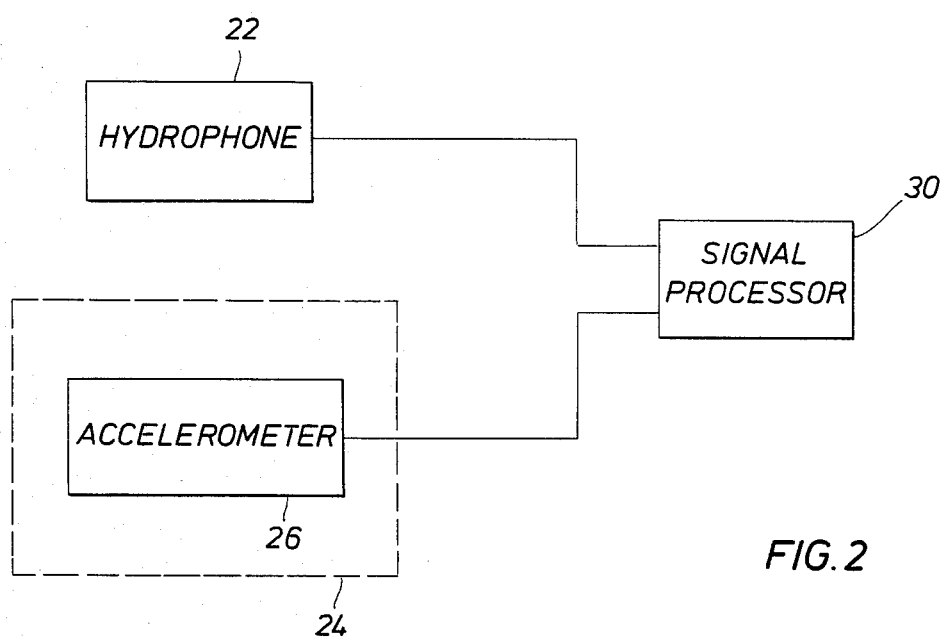
FIG. 2 is a schematic block diagram showing a seismic data acquisition system according to the present invention.

FIG. 2 illustrates a schematic block diagram of the seismic data acquisition system of the present invention. The primary pressure waves reflected from the substrata and the secondary pressure waves reflected from the air-water interface are detected by hydrophone 22. A sensor 24 for detecting the motion of the water particles accompanying the primary and secondary pressure waves can comprise an accelerometer 26, or alternatively, sensor 24 can comprise a particle displacement sensor, a particle velocity sensor, or any sensor that senses any derivative of particle displacement. Accelerometer 26 must measure the vertical component of the water particle motion or acceleration for all orientations. Accelerometers that are axially symmetric, that is, their response is invariant only for rotations about their axis and are sensitive only to particle movements that are parallel to their axis are unsuitable, because the particle motion is predominantly vertical and the cable rotation causes the accelerometer axis to be nonvertical. One accelerometer that has been found suitable for use is the WH-1 accelerometer manufactured by Litton Resources Systems of Houston, Tex. Preferably, accelerometer 26 is mounted in a low-noise mount as disclosed in my copending U.S. patent application, Ser. No. 300,430, which was filed Sept. 8, 1981, and is assigned to a common assignee.

The outputs of hydrophone 22 and accelerometer 26 are provided to signal processor 30 which can be located on seismic vessel 10 of FIG. 1. Signal processor 30 may be a digital computer or other suitable electronic processing equipment which performs the signal processing illustrated in the flow diagram of FIG. 5. As discussed above, the multiple reflections of the source wavelet from the various interfaces of the substrata results in a sequence of reflection wavelets that are distributed in time as shown in FIG. 3 by the wavelets for two reflection events. The time interval between generation of the acoustic energy and the subsequent reception of the received wavelet is an important parameter in seismic exploration. It is well known in the art that the phase spectra of the received wavelet will have a linear phase shift versus frequency component whose slope is proportional to the time delay. The signal processing of the present invention is applied to all of the reflection wavelets; however, for the sake of clarity, a single, base reflection wavelet occurring at an arbitrary time zero can be considered. The response to the plurality of reflection wavelets would be the superposition of the time delayed versions of the base wavelet response.

Figure 5:
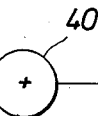
FIG. 5 is a flow chart illustrating a preferred method of processing the signals in the data acquisition system of FIG. 2.

Referring to FIGS. 3 and 5, the output signal from hydrophone 22, which is shown in FIG. 3(a), is provided to filter 32, and the output signal from accelerometer 26, which is shown in FIG. 3(b), is provided to filter 34. FIG. 3(c) illustrates a sample output of the particle velocity embodiment of motion sensor 24 which could be provided to filter 34 in place of the output from accelerometer 26. At filters 32 and 34 the amplitude of each frequency component contained in the particle acceleration and pressure wave signals is modified or normalized. In addition, filters 32 and 34 remove the phase angles associated with the signals to make all of the frequency components zero phase so that the signals can be added properly after the amplitude terms are weighted by the signal-to-noise filters, as discussed hereinbelow.

Figure 4A:
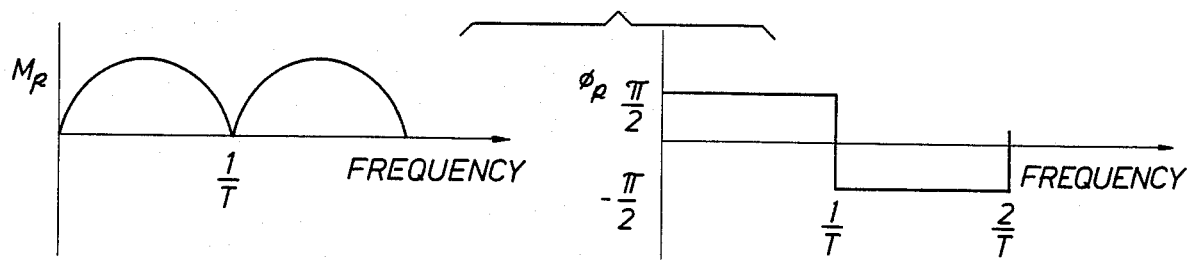
FIGS. 4a through 4b are plots of the pressure wave and particle acceleration spectra.
Figure 4B:
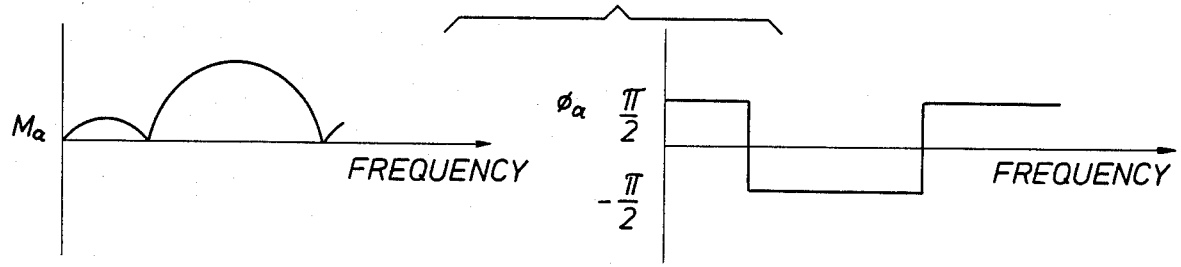

The particle acceleration and pressure wave signals can be represented by the functions $M_a e^{j\phi a}$ and $M_p e^{j\phi p}$, respectively, which are illustrated in FIGS. 4(a) and 4(b). For the sake of clarity, the spectra of a single, base reflection wavelet occurring at an arbitrary time zero has been considered in FIG. 4. The frequency spectra associated with both the hydrophone and accelerometer signals exhibit periodic notches caused by the secondary reflections from the surface of the water. The notches in the pressure wave signals occur at multiples of the frequency defined by the wave propagation velocity of the body of water, which is approximately 1500 meters per second, divided by two times the depth of the detector. The first notch frequency is equal to the reciprocal of the time interval T, which is the time for a wave to propagate from the detector to the surface and back to the detector. The notches in the particle acceleration signals occur at frequencies midway between the notches in the pressure wave spectra. Thus, peaks in the particle velocity response occur at pressure wave notch frequencies and vice versa. Filters 32 and 34 consist of the inverses of the particle acceleration and pressure wave functions, i.e., $$PF_a = \frac{1}{M_a} e^{-j\phi a} \text{ and}$$

$$PF_p = \frac{1}{M_p} e^{-j\phi p}$$

Filtering or multiplying in the frequency domain with the functions $PF_a$ and $PF_p$ accomplishes the normalization and zero phasing, except that the phase shifts caused by the nonzero time of arrival of the particular wavelet are preserved. The output from either filter 32 or filter 34, as shown in the exemplary waveform of FIG. 3(d), consists of primary and secondary pulses that have been collapsed to bandlimited spikes. It should be noted that the noise level is higher in the outputs of filters 32 and 34 than it is in the outputs of hydrophone 22 and accelerometer 26, because the notch frequencies are boosted by the filtering. The filter functions can be obtained by utilizing the theoretical equations for the particle acceleration and pressure signals in conjunction with laboratory measurements of the sensitivity of accelerometer 26 and hydrophone 22. Alternatively, the filter functions can be obtained by actual measurements with the cable in which the particle acceleration and pressure wave responses to seismic wave reflections from a known reflector are measured. In this case the effects of the source signature and the reflector must be removed prior to the calculation of the filter functions.

The signal-to-noise ratios of the pressure wave signals and the particle acceleration signals, as a function of frequency, are determined by tests performed prior to operation of the data acquisition system. The noise level is ascertained by measuring the noise detected by hydrophone 22 and accelerometer 26 when the cable is being towed and there is no deliberate acoustic excitation, and the signal level is ascertained from some strong reflection event. These tests are repeated to ensure the statistical accuracy of the results. The signal-to-noise ratio weighting functions for the pressure wave signal and the particle acceleration signal consist of a weighting factor for each frequency contained in the respective signals. These factors do not vary with changes in either signal or noise level provided that these changes are common to both hydrophone 22 and accelerometer 26. The relative signal-to-noise ratio weighting function or zero phase filter that is applied to the Fourier transform or frequency domain components of the pressure wave signal by filter 36 is defined as the signal-to-noise ratio for the pressure wave signal divided by the quantity consisting of the signal-to-noise ratio for the pressure wave signal plus the signal-to-noise ratio for the particle acceleration signal. Similarly, the relative signal-to-noise ratio weighting function or zero phase filter that is applied to the Fourier transform or frequency domain components of the particle acceleration signal by filter 38 is defined as the signal-to-noise ratio for the particle acceleration signal divided by the quantity consisting of the signal-to-noise ratio for the pressure wave signal plus the signal-to-noise ratio for the particle acceleration signal. The weighted pressure wave signal from filter 36 and the weighted particle acceleration signal from filter 38 are combined at point 40 to provide the bandlimited spike shown in FIG. 3(e). It should be noted that the noise level has been reduced by filters 36 and 38. The signal at point 40 is transmitted to further signal processing and recording equipment. Accordingly, the present invention provides a signal that has the maximum signal-to-noise ratio for each frequency component contained in the base wavelet.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. A method for obtaining a ghost-free marine seismic signal, comprising:
   supplying acoustic energy to a body of water above substrata to be seismically explored;
   detecting reflected seismic signals indicative of said substrata and corresponding ghost signals from the air-water interface with pressure sensors and with motion sensors;
   filtering each of said detected seismic and corresponding ghost signals to produce band-limited spike waveforms having arrival times intermediate the arrival times of said seismic and ghost signals as a function of the depth of detection of said signals;
   determining the signal-to-noise ratio for said pressure sensors and for said motion sensors;
   filtering said spike waveforms with zero phase filters having a band-limited frequency dependent amplitude spectrum functionally related to the signal-to-noise ratios for said sensors; and
   adding said filtered spike waveforms from said pressure sensors to said filtered spike waveforms from said motion sensors to form a filtered spike waveform having a maximum signal-to-noise ratio for each frequency component therein.

2. A method as recited in claim 1, wherein said zero phase filters further comprise:
   a frequency dependent first weighting function for said pressure signals; and
   a frequency dependent second weighting function for said motion signals, wherein the sum of said first and second weighting functions by frequency component is one.

3. A method as recited in claim 2, wherein said first weighting function comprises the signal-to-noise ratio of the pressure sensor divided by the sum of the signal to noise ratios of said pressure sensor and said motion sensor.

4. A method as recited in claim 3, wherein said second weighting function comprises the signal-to-noise ratio for said motion sensor divided by the sum of the signal-to-noise ratios of said pressure sensor and said motion sensor.

5. A method as recited in claim 1, wherein said motion sensors comprise acceleration sensors.

6. A method as recited in claim 5, wherein said zero phase filters further comprise:

a frequency dependent first weighting function for said pressure signals; and a frequency dependent second weighting function for said acceleration signals, wherein the sum of said first and second weighting functions by frequency component is one.

7. A method as recited in claim 6, wherein said first weighting function comprises the signal-to-noise ratio of the pressure sensor divided by the sum of the signal-to-noise ratios of said pressure sensor and said acceleration sensor.

8. A method as recited in claim 7, wherein said second weighting function comprises the signal-to-noise ratio for said acceleration sensor divided by the sum of the signal-to-noise ratios of said pressure sensor and said acceleration sensor.

* * * * *